United States Patent [19]

Russ

[11] Patent Number: 5,326,216

[45] Date of Patent: Jul. 5, 1994

[54] SELF-AUTO LOAD STEALTH DEVICE

[76] Inventor: Calvin W. Russ, 2119 E. Indian River Rd., Norfolk, Va. 23523

[21] Appl. No.: 28,703

[22] Filed: Feb. 25, 1993

[51] Int. Cl.$^5$ .............................................. B60P 3/12
[52] U.S. Cl. .................................... 414/563; 280/402
[58] Field of Search ............... 280/402; 212/229, 267, 212/268; 414/563

[56] References Cited

U.S. PATENT DOCUMENTS

| | | | |
|---|---|---|---|
| 3,749,254 | 7/1973 | Grider | 212/267 |
| 4,674,943 | 6/1987 | Nespor | 414/563 |
| 4,678,392 | 7/1987 | Capers et al. | 414/563 |
| 4,775,285 | 10/1988 | Zakovich | 280/402 |
| 4,797,057 | 1/1989 | Shoup et al. | 280/402 |
| 4,890,972 | 1/1990 | Nekola et al. | 280/402 |
| 4,948,327 | 8/1990 | Crupi | 280/402 |

Primary Examiner—Michael S. Huppert
Assistant Examiner—Thomas J. Brahan

[57] ABSTRACT

A vehicle carrier with wheel lifting apparatus for a truck having an underframe and consisting of a channel 21 having ledges 22 along an opening of the channel for partially enclosing the channel, the channel mounted to the underframe of the truck between a forward mount and a tail mount, a base 23 being slidably received within the channel and being movably carried on the ledges, subtending arm 40 pivotally mounted to the base 23 at one end and secured at the other end to a rearwardly disposed housing 47, telescoping member assembly 45 mounted within the housing 47 for retracting or extending the telescoping member assembly 45, the end member of which terminates at a pivot, transverse member 61 extending laterally in opposite directions from the pivot, wheel supports mounted on the transverse member for selectively engaging and disengaging vehicular wheels from the wheel supports, first hydraulic means connectively extending between the tail mount 19 and the base 23, second hydraulic means connectively extending between the tail mount and the housing, third hydraulic means connectively extending between the housing and the pivot of the telescopic member assembly, fourth hydraulic means on the lateral or transverse member connectively extending between the pivot to each of the ends thereof for enabling selective engagement and disengagement of the wheel supports with the behicular wheels, and each of the first to the fourth hydraulic means cooperatively operable to effect the wheel lifting apparatus. An obtuse angle of greater than 163° is distended between a longitudinal axis of the arm and the horizontal surface of the housing.

4 Claims, 1 Drawing Sheet

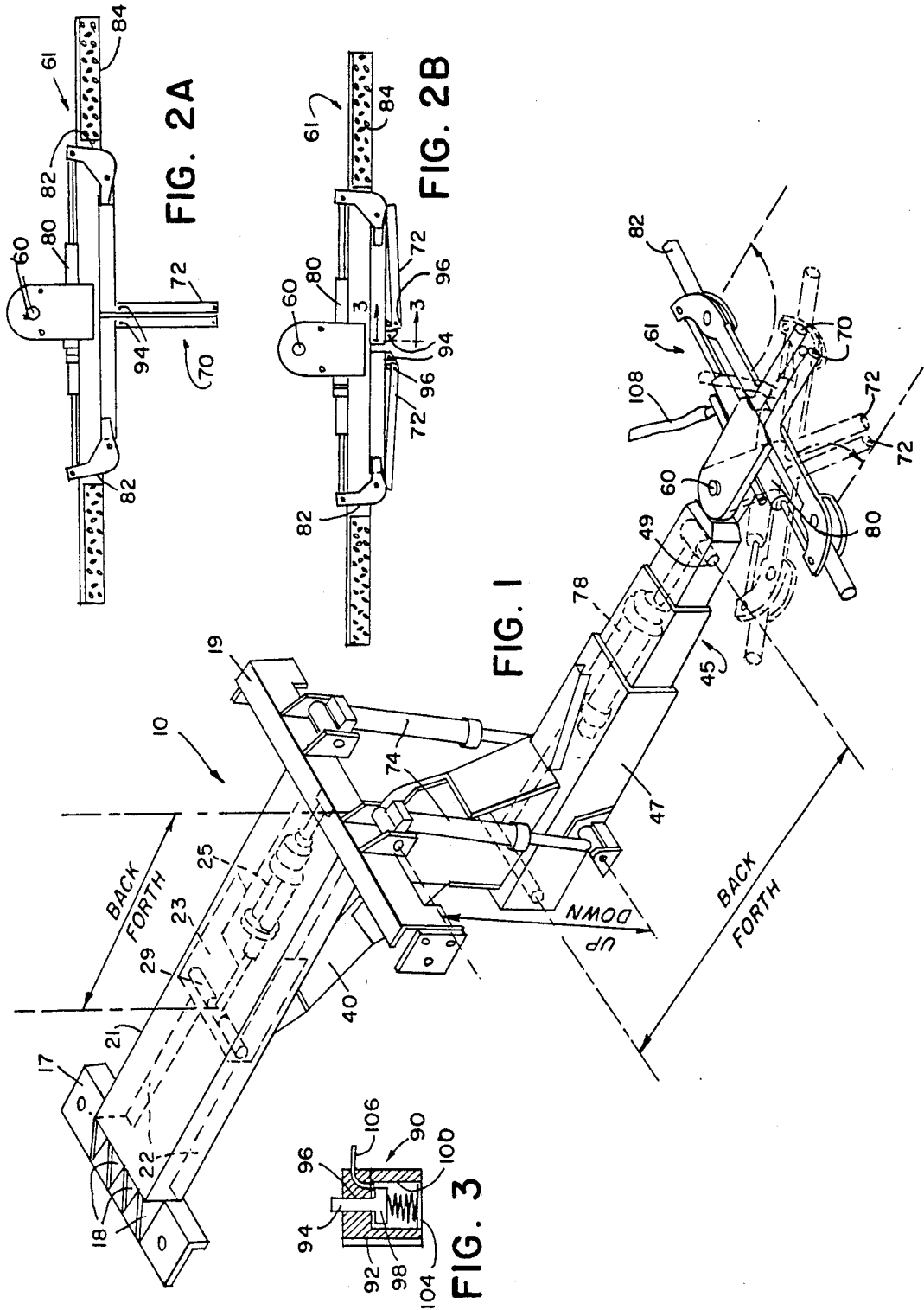

SELF-AUTO LOAD STEALTH DEVICE

FIELD OF THE INVENTION

The invention relates to a vehicle carrier with wheel lift apparatus for installation on a pickup having an underframe and consisting of an electro hydraulic power pack for stealthily or otherwise approaching and retrieving vehicles for repossession, overparking and like standing violations, and like purposes, including from extended side positions with respect to an axis of the truck. The self-loading wheel lift is found to be useful when adapted to pickup truck configurations, including dual wheel pickup trucks of at least 1 ton GVW.

The invention more particularly relates to vehicle carrier with wheel lifting apparatus for a truck having an underframe and consisting of a channel 21 having ledges 22 along an opening of the channel for partially enclosing the channel, the channel mounted to the underframe of the truck between a forward mount and a tail mount, a base 23 being slidably received within the channel and being movably carried on the ledges, subtending arm 40 pivotally mounted to the base 23 at one end and secured at the other end to a rearwardly disposed housing 47, telescoping member assembly 45 mounted within the housing 47 for retracting or extending the telescoping member assembly 45, the end member of which terminates at a pivot, transverse member 61 extending laterally in opposite directions from the pivot, wheel supports mounted on the transverse member for selectively engaging and disengaging vehicular wheels from the supports, first hydraulic means connectively extending between the tail mount 19 and the base 23, second hydraulic cylinder connectively extending between the tail mount and the housing, third hydraulic cylinder connectively extending between the housing and the pivot of the telescopic member assembly, fourth hydraulic cylinder on the lateral or transverse member connectively extending between the pivot to each of the ends thereof for enabling selective engagement and disengagement of the wheel supports with the vehicular wheels, and each of the first to the fourth hydraulic cylinder being cooperatively operable to effect the wheel lifting apparatus. An obtuse angle of greater than 163° is distended between a longitudinal axis of the arm and the horizontal surface of the housing; and also to the method of the construction thereof, as is more particularly described herein.

BACKGROUND OF THE INVENTION

Description of the Prior Art

Various prior art wheel lift and vehicle carrier apparatus, and the like, as well as apparatus and method of their construction in general, are found to be known; and exemplary of the U.S. prior art are the following:

| | |
|---|---|
| Moore | 3,797,675 |
| LoCodo | 4,264,262 |
| Stage | 4,563,018 |
| Russ | 4,564,207 |
| Hamman | 4,634,337 |
| Capers | 4,678,392 |
| Bubik | 4,793,763 |
| Crupi | 4,815,915 |
| Bubik | 4,874,286 |
| Nespor | 4,929,142 |
| Alm | 4,968,052 |
| Holmes | 5,039,272 |
| Nespor | 5,061,147 |
| Bell | 5,123,802 |

Capers and the patents to Nespor disclose wheel lift systems; Nespor shows a hydraulically lifted frame having the vehicle lifting apparatus thereon and in which is a hydraulic motor to swing inwardly and downwardly a wheel lift assembly in a vertical arc and Capers shows a hydraulic cylinder in an inclined disposed for probable elevation of wheel supports; all of these patents are seen disclosing entirely different and distinctive concepts other than the concept of the present invention.

These patents or known prior uses teach and disclose various types of wheel lifting apparatus of various sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide an array of cylinders in a vehicle carrier with wheel lift apparatus including having at least four sets of hydraulic cylinder systems to function for advantageously raising or lifting a wheeled vehicle with essentially substantial dispatch.

Another object of the invention is directed further to a device providing for including having at least four sets of hydraulic cylinder systems to function for advantageously raising or lifting a wheeled vehicle with essentially substantial dispatch, and for providing hydraulic locks on selected joints on terminal sets or members or on at least a last arrangement of hydraulic cylinders that lock a folding or usual L-shaped arms in its extended position and for capturing the wheel of a vehicle when a wheel lift is used, and having ends of these L-shapped arms secured in an adjacent telescopically received position with a quick releasable locking device over that described in column 4 of Bell U.S. Pat. No. 5,123,802 and Alm U.S. Pat. No. 4,968,052, supra, and the disclosures of which are incorporated herein by reference.

Another object of the invention is to provide a vehicle carrier with wheel lifting apparatus for a truck having an underframe and consisting of a channel 21 having ledges 22 along an opening of the channel for partially enclosing the channel, the channel mounted to the unframe of the truck between a forward mount and a tail mount, a base 23 being slidably received within the channel and being movably carried on the ledges, subtending arm 40 pivotally mounted to the base 23 at one end and secured at the other end to a rearwardly disposed housing 47, telescoping member assembly 45 mounted within the housing 47 for retracting or extending the telescoping member assembly 45, the end member of which terminates at a pivot, transverse member 61 extending laterally in opposite directions from the pivot, wheel supports mounted on the transverse member for selectively engageing and disengaging vehicular wheels from the supports, first hydraulic cylinder connectively extending between the tail mount 19 and the base 23, second hydraulic cylinder connectively extending between the tail mount and the housing, third hydraulic cylinder connectively extending between the housing and the pivot of the telescopic member assembly, fourth hydraulic cylinder on the lateral or transverse member connectively extending between the pivot to each of the ends thereof for enabling selective engagement and disengagement of the wheel supports with the vehicular wheels, and each of the first to the fourth hydraulic cylinder being cooperatively operable to effect the wheel lifting apparatus. An obtuse angle of greater than 163° is distended between a longitudinal axis of the arm and the horizontal surface of the housing; and also to the method of the construction thereof, as is more particularly described herein.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

FIG. 1 is a perspective view of a wheel lifting apparatus and illustrating a typical installation of the system according to a preferred embodiment and best mode of the present invention.

FIGS. 2A and 2B are plan views of a folded and unfolded disposition of wheel engagable supports 70 to engage vehicular wheels and embodying the concepts of the invention.

FIG. 3 is a sectional view of a locking stud and hydraulic line thereto for locking the unfolded arms in to place when disposed in an extended position of FIG. 1 and embodying the concepts of the invention.

DESCRIPTION OF A PREFERRED EMBODIMENT OF THE INVENTION

Referring now to the drawings there is shown in FIG. 1 a wheel lifting apparatus 10 for a truck or automotive vehicle (not shown) having a conventional frame members or underframe and a bed. The frame members may consist of two beams (of well known construction but not shown) generally extending longitudinally thereof. The wheel lift apparatus 10 of the best mode of the invention has two cross members including an angle bracket or forward mount 17 shown with gussets 18 and an angle bracket or rear mounted tail board 19 for securably mounting to the frame members under the bed. The forward mount 17 and the tail board may be secured by bolting or otherwise securing to the frame members.

A composited flat plate 20 with side angle brackets form a channel 21 having ledges 22 disposed along an opening of the channel for partially enclosing the channel and which extend longitudinally parallel to a longitudinal axis of the truck between the forward mount 17 and the tail mount 19. The channel 21 is mounted to the unframe of the truck between the forward mount 17 and the tail mount 19, and may be straight square tubular members being spaced apart, but spaced apart less than the distance between the two frame members. A slide shoe or moving base 23 is slidably received within the channel 21 and is movably carried on the ledges 22 while internally and matingly engaging within the channel 21 for it sliding along the longitudinal length thereof.

The base 23 is slidably carried within the channel. A hydraulic cylinder 25 has one end connected to the forward mount 17. The shaft 27 for the hydraulic cylinder 25 is connected to a cross brace 29 extending between the two tubular members of the base 23. Hydraulic cylinder 25 is seen to connectively extend between the tail mount 19 and the base 23.

A subtending arm 40 pivotally mounted to the base 23 at one end and is secured at the other end to a rearwardly disposed housing 47. A telescoping member assembly 45 is mounted within the housing 47 and is actuated to selected retracted or extended positions by a hydraulic cylinder 78 within the telescoping member assembly 45, the end member of which terminates at a pivot 49.

Connected to the end of the telescoping member assembly 45 of the housing 47 by a pivot 60 is a transverse member 61 having ends 82-84 extending laterally in opposite directions from the pivot 60, from which, with ends 82-84 and L-shaped arms or wheel reteainer brackets or supports 70 mounted from the transverse member 61 for selectively engaging and disengaging vehicular wheels from the supports, which are more generally disclosed in Russ U.S. Pat. No. 4,564,207 cited above, and the disclosure of which is incorporated herein by reference.

The first hydraulic cylinder 25 connectively extends between the tail mount 19 and the base 23; the second hydraulic cylinder 74 connectively extends between the tail mount 19 and the housing 47; the further or third hydraulic cylinder 78 connectively extends between the housing 47 and the pivot 60 of the telescopic member assembly 45; a fourth hydraulic cylinder 80 disposed on the lateral member or transverse member 61 and connectively extends between the pivot 60 to each of the ends 82-84 thereof for selectively enabling engagement and disengagement of the L-shaped arms or wheel retainer brackets or supports 70 with the vehicular wheels (not shown), and each of the first to the fourth hydraulic cylinders 25, 74, 78, 80 being cooperatively operable to effect the wheel lifting apparatus.

In one of a preferred set of embodiments of the invention and for purposefully and advantageously raising or lifting a wheeled vehicle with essentially substantial dispatch, there is provided that the transverse member 61 may move or turn about an arc of an obtuse angle of greater than 163° which is distended between the longitudinal axis of the arm and the horizontal surface of the housing, as is more particularly and essentially shown by dotted lines in FIG. 1.

The L-shaped arms 72 may specifically be locked in place as shown only by FIGS. 2A, 2B and 3 which provides hydraulic locks 90 on selected joints on terminal sets or members or on at least a last arrangement of hydraulic cylinders, such as the transverse member 61, that lock folding or usual L-shaped arms 72 in its extended position and for capturing the wheel of a vehicle when a wheel lift is used, and having ends of these L-shaped arms 72 secured in an adjacent telescopically received position with the quick releasable locking device 92, which is distinct over that described in column 4 of Bell U.S. Pat. No. 5,123,802 and Alm U.S. Pat. No. 4,968,052, supra.

The locking device 92 includes a locking stud 94 disposed to extend from the lock 90 through an engagement aperture 96, the stud 94 communicating with a piston 98 that reciprocates in a piston chamber 100. The piston 98 is biassed by a compression spring 102 that extends the stud 94 into its locked position; the chamber 100 may include compression washer or plate 104 upon which the compression spring 102 may be positioned within a closure of the chamber 100, and which may contain a centrally extending aperture or line 106 for release of any accumulated hydraulic fluids.

The lock device 92 is released form its lock position by hydraulic pressure from a source (not shown) applied over the line 106 and/or over line 108 of FIG. 1. On appropriate application of line pressure from the source, the lock device 92 may be unlocked by the application of hydraulic pressure upon the cylinder 98 to displace it downwardly for removing the stud 94 from an engagement aperture ofb the L-shaped arm 72 mating with stud 94.

The apparatus of the wheel lift apparatus 10 of the invention may be so constructed and arranged in its component parts that it may be constructed and assembled as a kit or in kit form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters Patent is:

1. A vehicle carrier with wheel lifting apparatus for a truck having an underframe comprising
   a channel having ledges along an opening of the channel for partially enclosing the channel, the channel being mounted to the underframe of the truck between a forward mount and a tail mount,
   a base being slidably received within the channel and being movably carried on the ledges,
   subtending arm pivotally mounted to the base at one end and secured at the other end to a rearwardly disposed housing,
   telescoping member assembly mounted within the housing for retracting or extending the telescoping member assembly, the end member of which terminates at a pivot,
   transverse member extending laterally in opposite directions from the pivot,
   wheel retainer supports mounted on the transverse member for selectively engaging and disengaging vehicular wheels from the wheel retainer supports,
   first hydraulic means connectively extending between the tail mount and the base,
   second hydraulic means connectively extending between the tail mount and the housing,
   third hydraulic means connectively extending between the housing and the pivot of the telescopic member assembly,
   fourth hydraulic means on the transverse member connectively extending between the pivot to each of the ends thereof for enabling selective engagement and disengagement of the wheel retainer supports with the vehicular wheels,
   fifth hydraulic means mounted on the transverse member proximate the wheel retainer supports, the fifth hydraulic means including a piston chamber having a hydraulicly driven reciprocating member, a stud extending from the piston through a wall of the chamber for engaging an aperture of the wheel retainer supports when lockingly engaging the aperture, and
   each of the first to the fourth hydraulic means being cooperatively operable to effect the wheel lifting apparatus of the vehicle carrier.

2. The apparatus of claim 1 wherein a horizontal axis of the transverse member and a horizontal surface of the housing are so constructed that the transverse member distends through an obtuse angle of greater than 163° with respect to the axis of the housing.

3. The apparatus of claim 1 wherein the the fifth hydraulic means includes
   a compression spring to secure the stud in place in the arm until release by a control means.

4. The apparatus of claim 3 wherein the fifth hydraulic means contains an aperture for release of any collected hydraulic fluids that may be received therein.

* * * * *